(12) United States Patent
Sivakumar et al.

(10) Patent No.: US 12,541,720 B2
(45) Date of Patent: Feb. 3, 2026

(54) AGGREGATION MODEL REPLICATION AT A DISASTER RECOVERY SITE

(71) Applicant: International Business Machines Corporation, Armonk, NY (US)

(72) Inventors: Gandhi Sivakumar, Bentleigh (AU); Luke Peter Macura, Lucas (AU); Kushal S. Patel, Pune (IN); Sarvesh S. Patel, Pune (IN)

(73) Assignee: International Business Machines Corporation, Armonk, NY (US)

( * ) Notice: Subject to any disclaimer, the term of this patent is extended or adjusted under 35 U.S.C. 154(b) by 1105 days.

(21) Appl. No.: 17/469,580

(22) Filed: Sep. 8, 2021

(65) Prior Publication Data

US 2023/0072677 A1    Mar. 9, 2023

(51) Int. Cl.
    *G06N 20/20*    (2019.01)
    *G06N 3/098*    (2023.01)
    *G06N 20/00*    (2019.01)

(52) U.S. Cl.
    CPC ............ *G06N 20/20* (2019.01); *G06N 3/098* (2023.01); *G06N 20/00* (2019.01)

(58) Field of Classification Search
    CPC ......... G06N 20/20; G06N 20/00; G06N 3/098
    See application file for complete search history.

(56) References Cited

U.S. PATENT DOCUMENTS

| 6,021,113 A | 2/2000 | Doshi |
| 6,845,393 B1 | 1/2005 | Murphy |
| 9,633,315 B2 | 4/2017 | Chapelle |
| 11,734,614 B1 * | 8/2023 | Wang ............ G06Q 30/016 706/12 |
| 2014/0365437 A1 | 12/2014 | Srinivasan |

(Continued)

FOREIGN PATENT DOCUMENTS

| CN | 107111530 A | 8/2017 |
| CN | 110764954 A | 2/2020 |

(Continued)

OTHER PUBLICATIONS

Martin et al., "Kafka-ML: connecting the data stream with ML/AI frameworks" Jul. 16, 2020, arXiv: 2006.04105v2, pp. 1-10. (Year: 2020).*

(Continued)

*Primary Examiner* — Miranda M Huang
*Assistant Examiner* — Chase P. Hinckley
(74) *Attorney, Agent, or Firm* — Joseph P. Curcuru

(57) ABSTRACT

An approach is provided in which the approach establishes a connection between a first data site and a second data site. The first data site executes a first aggregation model that includes multiple first machine learning models and the second data site executes a second aggregation model that includes multiple second machine learning models. The approach detects, at the first data site, a change of data in a selected one of multiple first training data buckets corresponding to a selected one of the multiple first machine learning models. The approach sends the change of data from the first data site to the second data site, and replicates at the second data site, one of multiple second data buckets corresponding to a selected one of the multiple second machine learning models based on the change of data.

14 Claims, 7 Drawing Sheets

(56) References Cited

U.S. PATENT DOCUMENTS

| | | | |
|---|---|---|---|
| 2019/0188094 A1* | 6/2019 | Ramamoorthi | G06F 11/203 |
| 2019/0370132 A1 | 12/2019 | Salapura | |
| 2019/0370490 A1 | 12/2019 | Patel | |
| 2020/0007620 A1* | 1/2020 | Das | H04L 67/62 |
| 2020/0105272 A1* | 4/2020 | Wu | G06F 16/3347 |
| 2020/0128072 A1 | 4/2020 | Trim | |
| 2020/0257700 A1 | 8/2020 | Xu | |
| 2020/0401316 A1* | 12/2020 | Hankins | G06F 12/0868 |
| 2021/0081432 A1* | 3/2021 | Grunwald | G06F 11/1471 |
| 2021/0342743 A1* | 11/2021 | Woolf | G06F 16/245 |
| 2022/0114499 A1* | 4/2022 | Lou | G06N 5/04 |
| 2022/0138618 A1* | 5/2022 | Lee | G06F 18/241 706/12 |
| 2022/0180176 A1* | 6/2022 | Nisbet | G06F 12/0855 |
| 2022/0197761 A1* | 6/2022 | Pound | G06F 11/0709 |
| 2022/0237090 A1* | 7/2022 | Ferreira | H04L 67/1095 |
| 2022/0269979 A1* | 8/2022 | Vichare | G06Q 10/0635 |
| 2023/0014399 A1* | 1/2023 | Khan | G06F 9/45558 |
| 2023/0072677 A1* | 3/2023 | Sivakumar | H04L 67/55 |

FOREIGN PATENT DOCUMENTS

| | | | |
|---|---|---|---|
| EP | 3092776 A1 | 11/2016 | |
| WO | 2014113367 | 7/2014 | |
| WO | 2015103514 | 7/2015 | |
| WO | WO-2022077231 A1 * | 4/2022 | G06N 20/20 |
| WO | 2023/036080 A1 | 3/2023 | |

OTHER PUBLICATIONS

Xia et al., "Auto-FedAvg: Learnable Federated Averaging for Multi-Institutional Medical Image Segmentation" Apr. 20, 2021, arXiv: 2104.10195v1, pp. 1-11. (Year: 2021).*

Breiman, Leo "Bagging Predictors" 1996, pp. 1-18. (Year: 1996).*

Carnero et al., "Managing and Deploying Distributed and Deep Neural Models Through Kafka-ML in the Cloud-to-Things Continuum" Sep. 2021, pp. 125478-125495. (Year: 2021).*

Gaïffas et al., "WildWood: a new Random Forest algorithm" Sep. 16, 2021, arXiv: 2109.08010v1, pp. 1-28. (Year: 2021).*

Brophy et Lowd, "Machine Unlearning for Random Forests" Jun. 11, 2021, arXiv: 2009.05567v2, pp. 1-29. (Year: 2021).*

Khan et al., "Optimal trees selection for classification via out-of-bag assessment and sub-bagging" Dec. 30, 2020, pp. 1-20. (Year: 2020).*

Kunz et al., "Towards Tracking Data Flows in Cloud Architectures" Jul. 10, 2020, arXiv: 2007.05212v1, arXiv: 2007.05212v1, pp. 1-11. (Year: 2020).*

Mourtada et al., "AMF: Aggregated Mondrian Forests for Online Learning" May 15, 2020, arXIv: 1906.10529v2, pp. 1-35. (Year: 2020).*

He et al., "Booster: An Accelerator for Gradient Boosting Decision Trees" Nov. 5, 2020, arXiv: 2011.02022v2, pp. 1-14. (Year: 2020).*

Min et al., "Large Graph Convolutional Network Training with GPU-Oriented Data Communication Architecture" Aug. 14, 2021, arXiv: 2103.03330v3, pp. 1-13. (Year: 2021).*

Waddington et al., "A High-Performance Persistent Memory Key-Value Store with Near-Memory Compute" Apr. 12, 2021, arXiv: 2104.06225v1, pp. 1-15. (Year: 2021).*

Xu et Shu, "An Efficient Bucket Logging for Persistent Memory" Aug. 2021, pp. 149-163. (Year: 2021).*

Li et al., "PyTorch Distributed: Experiences on Accelerating Data Parallel Training" Jun. 28, 2020, arXiv: 2006.15704v1, pp. 1-14. (Year: 2020).*

Ma et al., "Stack-Pointer Networks for Dependency Parsing" May 3, 2018, arXiv: 1805.01087v1, pp. 1-15. (Year: 2018).*

Liu et al., "Hierarchical Pointer Net Parsing" Aug. 30, 2019, arXiv: 1908.1157v1, pp. 1-11. (Year: 2019).*

International Search Report and Written Opinion for International Application No. PCT/CN2022/117022, National Intellectual Property Administration, Beijing, China, mailed Nov. 28, 2022, 10 pages.

Tuor et al., "Demo Abstract: Distributed Machine Learning at Resource-Limited Edge Nodes," IEEE INFOCOM 2018—IEEE Conference on Computer Communications Workshops (INFOCOM Wkshps), Apr. 2018, Honolulu, Hawaii, 2 pages.

Tamimi et al., "Disaster Recovery Techniques in Cloud Computing," 2019 IEEE Jordan International Joint Conference on Electrical Engineering and Information Technology (JEEIT), Apr. 2019, Amman, Jordan, pp. 845-850.

Barrett, "New ITU standard to introduce Machine Learning into 5G networks ," ITUNews, Terrestrial Wireless Communications edition, Aug. 2019, 5 pages.

"Optimizing Network Applications for 5G," Ericsson, News, Apr. 21, 2017, 3 pages.

IBM. "AIOps from IBM", Revolutionize IT Operations with AI, retrieved from https://web.archive.org/web/20210115190939/https://www.ibm.com/watson/aiops, dated Jan. 15, 2021, 7 pages.

* cited by examiner

Information Handling System Processor and Components

AGGREGATION MODEL REPLICATION AT A DISASTER RECOVERY SITE

BACKGROUND

Industry trends are emerging towards "cognitive models" enabled via a Big Data platform. Such models, referred to as "cognitive entities," are aimed to remember the past, interact with humans, continuously learn, and refine their future responses. Their cognitive capabilities enrich the automation of human needs based on time and situation to provide dynamic responses and increase user satisfaction.

A major component of cognitive entities is machine learning models. These models typically include input features sets and a mathematical model that are used as a basis for genesis while computing outcomes. The outcomes vary based on the type of machine leaning model, its algorithm, input training corpus and other interrelated fields. The models can be classification models or regression-dependent models based on the need of the environment. Cognitive systems may include many machine learning models with different functions and operation feature-sets to produce an outcome that, in turn, creates a stronger cognitive ecosystem.

Emerging ecosystems for dissimilar machine learning modeling use a service orchestration layer, such as a 5G service orchestration layer. In the service orchestration layer, cognitive orchestration services are deployed that use various machine learning models to produce real time cognition capabilities for user data. In these types of interfaces, thousands of machine learning models may be deployed to establish the network itself as a cognitive entity.

Disaster Recovery (DR) systems are designed to provide business continuity and recovery following natural or man-made disasters and outages. The ultimate goal of disaster recovery is to recover and restore data and applications in physical or virtual environments to their pre-disaster, functional state with minimal time and minimal difficulty. Having a disaster recovery strategy in place enables an organization to maintain or quickly resume mission-critical functions following a disruption. A disruptive event can be anything that puts an organization's operations at risk, from a cyberattack to power outages and equipment failures to natural disasters. The goal of disaster recovery is for businesses to continue operating as close to normal as possible.

BRIEF SUMMARY

According to one embodiment of the present disclosure, an approach is provided in which the approach establishes a connection between a first data site and a second data site. The first data site executes a first aggregation model that includes multiple first machine learning models and the second data site executes a second aggregation model that includes multiple second machine learning models. The approach detects, at the first data site, a change of data in a selected one of multiple first training data buckets corresponding to a selected one of the multiple first machine learning models. The approach sends the change of data from the first data site to the second data site, and replicates at the second data site, one of multiple second data buckets corresponding to a selected one of the multiple second machine learning models based on the change of data.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present disclosure, as defined solely by the claims, will become apparent in the non-limiting detailed description set forth below.

BRIEF DESCRIPTION OF THE SEVERAL VIEWS OF THE DRAWINGS

The present disclosure may be better understood, and its numerous objects, features, and advantages made apparent to those skilled in the art by referencing the accompanying drawings, wherein.

DETAILED DESCRIPTION

Figure 1:
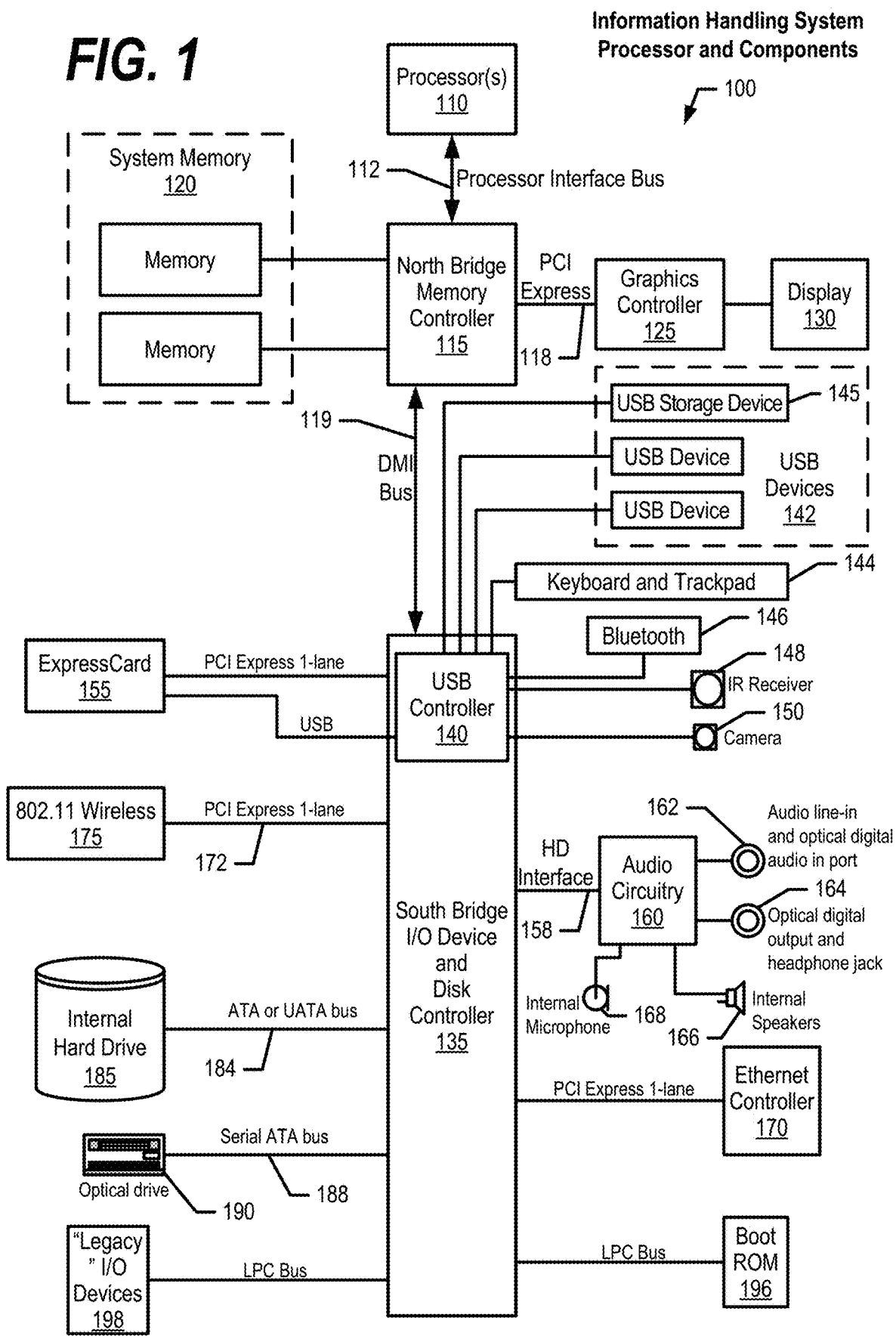
FIG. 1 is a block diagram of a data processing system in which the methods described herein can be implemented.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. The following detailed description will generally follow the summary of the disclosure, as set forth above, further explaining and expanding the definitions of the various aspects and embodiments of the disclosure as necessary.

FIG. 1 illustrates information handling system 100, which is a simplified example of a computer system capable of performing the computing operations described herein. Information handling system 100 includes one or more processors 110 coupled to processor interface bus 112. Processor interface bus 112 connects processors 110 to Northbridge 115, which is also known as the Memory Controller Hub (MCH). Northbridge 115 connects to system memory 120 and provides a means for processor(s) 110 to access the system memory. Graphics controller 125 also connects to Northbridge 115. In one embodiment, Peripheral Component Interconnect (PCI) Express bus 118 connects Northbridge 115 to graphics controller 125. Graphics controller 125 connects to display device 130, such as a computer monitor.

Northbridge 115 and Southbridge 135 connect to each other using bus 119. In some embodiments, the bus is a Direct Media Interface (DMI) bus that transfers data at high speeds in each direction between Northbridge 115 and Southbridge 135. In some embodiments, a PCI bus connects the Northbridge and the Southbridge. Southbridge 135, also known as the Input/Output (I/O) Controller Hub (ICH) is a chip that generally implements capabilities that operate at slower speeds than the capabilities provided by the Northbridge. Southbridge 135 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 196 and "legacy" I/O devices (using a "super I/O" chip). The "legacy" I/O devices (198) can include, for example, serial and parallel ports, keyboard, mouse, and/or a floppy disk controller. Other components often included in Southbridge 135 include a Direct Memory Access (DMA) controller, a Programmable Interrupt Controller (PIC), and a storage device controller, which connects Southbridge 135 to nonvolatile storage device 185, such as a hard disk drive, using bus 184.

ExpressCard 155 is a slot that connects hot-pluggable devices to the information handling system. ExpressCard 155 supports both PCI Express and Universal Serial Bus (USB) connectivity as it connects to Southbridge 135 using both the USB and the PCI Express bus. Southbridge 135 includes USB Controller 140 that provides USB connectivity to devices that connect to the USB. These devices include webcam (camera) 150, infrared (IR) receiver 148, keyboard and trackpad 144, and Bluetooth device 146, which provides for wireless personal area networks (PANs). USB Controller 140 also provides USB connectivity to other miscellaneous USB connected devices 142, such as a mouse, removable nonvolatile storage device 145, modems, network cards, Integrated Services Digital Network (ISDN) connectors, fax, printers, USB hubs, and many other types of USB connected devices. While removable nonvolatile storage device 145 is shown as a USB-connected device, removable nonvolatile storage device 145 could be connected using a different interface, such as a Firewire interface, etcetera.

Wireless Local Area Network (LAN) device 175 connects to Southbridge 135 via the PCI or PCI Express bus 172. LAN device 175 typically implements one of the Institute of Electrical and Electronic Engineers (IEEE) 802.11 standards of over-the-air modulation techniques that all use the same protocol to wirelessly communicate between information handling system 100 and another computer system or device. Optical storage device 190 connects to Southbridge 135 using Serial Analog Telephone Adapter (ATA) (SATA) bus 188. Serial ATA adapters and devices communicate over a high-speed serial link. The Serial ATA bus also connects Southbridge 135 to other forms of storage devices, such as hard disk drives. Audio circuitry 160, such as a sound card, connects to Southbridge 135 via bus 158. Audio circuitry 160 also provides functionality associated with audio hardware such as audio line-in and optical digital audio in port 162, optical digital output and headphone jack 164, internal speakers 166, and internal microphone 168. Ethernet controller 170 connects to Southbridge 135 using a bus, such as the PCI or PCI Express bus. Ethernet controller 170 connects information handling system 100 to a computer network, such as a Local Area Network (LAN), the Internet, and other public and private computer networks.

While FIG. 1 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, Automated Teller Machine (ATM), a portable telephone device, a communication device or other devices that include a processor and memory.

Figure 2:
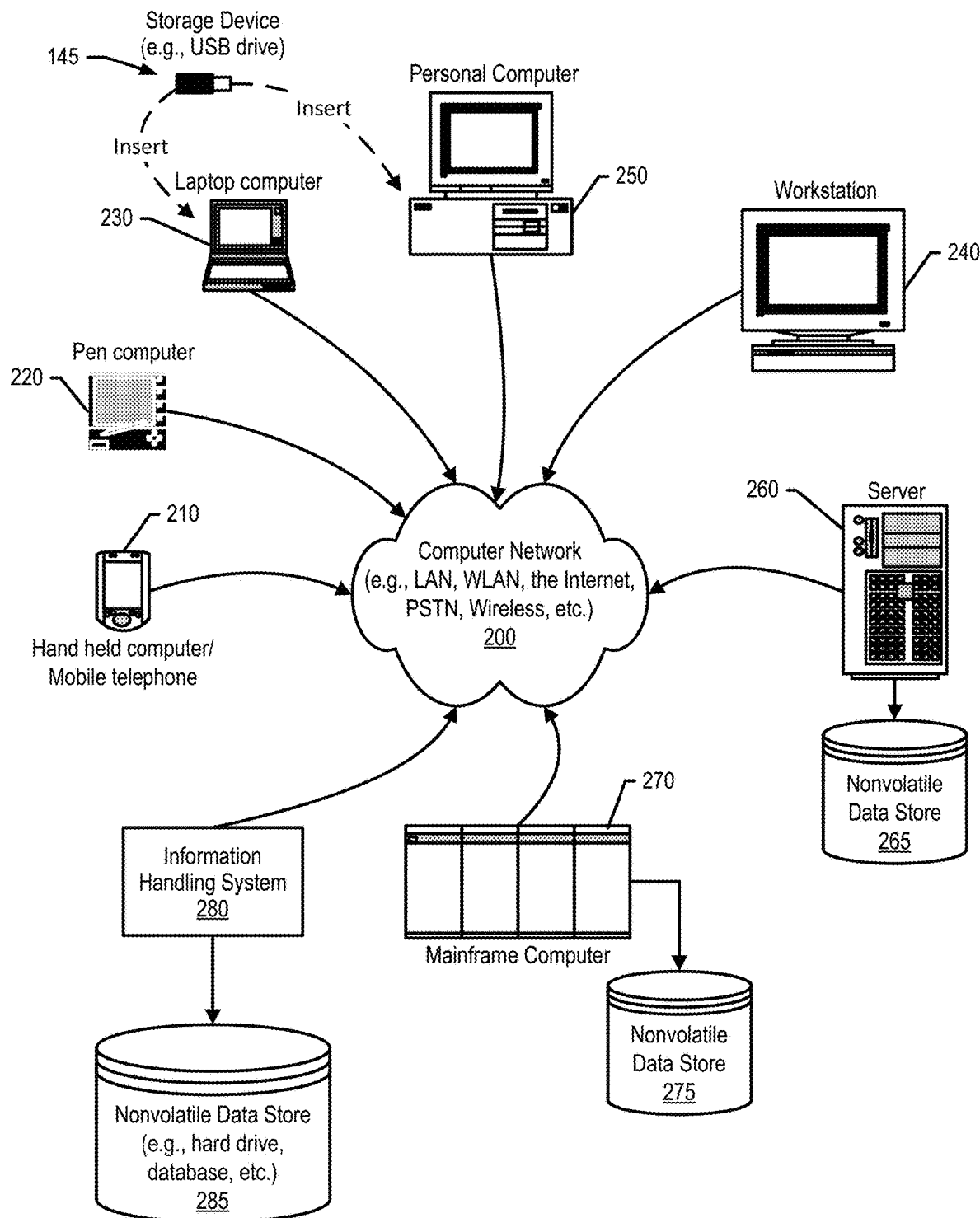
FIG. 2 provides an extension of the information handling system environment shown in FIG. 1 to illustrate that the methods described herein can be performed on a wide variety of information handling systems which operate in a networked environment.

FIG. 2 provides an extension of the information handling system environment shown in FIG. 1 to illustrate that the methods described herein can be performed on a wide variety of information handling systems that operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as Moving Picture Experts Group Layer-3 Audio (MP3) players, portable televisions, and compact disc players. Other examples of information handling systems include pen, or tablet, computer 220, laptop, or notebook, computer 230, workstation 240, personal computer system 250, and server 260. Other types of information handling systems that are not individually shown in FIG. 2 are represented by information handling system 280. As shown, the various information handling systems can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. The embodiment of the information handling system shown in FIG. 2 includes separate nonvolatile data stores (more specifically, server 260 utilizes nonvolatile data store 265, mainframe computer 270 utilizes nonvolatile data store 275, and information handling system 280 utilizes nonvolatile data store 285). The nonvolatile data store can be a component that is external to the various information handling systems or can be internal to one of the information handling systems. In addition, removable nonvolatile storage device 145 can be shared among two or more information handling systems using various techniques, such as connecting the removable nonvolatile storage device 145 to a USB port or other connector of the information handling systems.

As discussed above, cognitive entities deploy thousands of machine learning models to provide cohesive user experiences, and disaster recovery is a key component of ensuring continuity and recovery following natural or man-made disasters and outages. As a result, machine learning models and their respective data are required to be present at a disaster recovery site to operate their corresponding application from the disaster recovery site if needed.

Bootstrap aggregating, or bagging, is a machine learning ensemble meta-algorithm designed to improve the stability and accuracy of machine learning algorithms used in statistical classification and regression. An "aggregation model" includes multiple machine learning models working in conjunction to provide accurate answers. Bootstrap aggregating also reduces variances and helps to avoid overfitting. Although bootstrap aggregating is usually applied to decision tree methods, bootstrap aggregating can be used with various types of methods.

Bagging is a special type of a model averaging approach. In bagging, as the aggregation model trains, the datasets in the training corpus are categorized into various "buckets" based on the aggregation model algorithm. The buckets correspond to the classes of the data set which are most relevant based on a current situation. As the aggregation model starts building machine learning models, the buckets are refined to get updated inferences from input datasets, which creates reformations of the buckets inside the aggregation model algorithm. Additionally, in aggregation models, the upper levels (e.g., functions that manage job submission requests) are more aggregated and possess a combination of sub-buckets that converge to a single bucket at a top-level entity.

In high availability (HA) for disaster recovery models, the aggregation model rebuilding happens at the disaster recovery location using data transmitted to the disaster recovery site. The disaster recovery repository is generally used to construct the aggregation model at the disaster recovery site, which is used when the primary site observes a failure. In high availability and disaster recovery, the data must be available at both the sites that are being used to train the machine learning models independently at both the locations. Because of this, the time requirement increases at the disaster recover site for machine learning model construction because the disaster recovery site is required to capture change data from the primary site. Furthermore, with aggregation models, the "bucketization" at the primary site may occur in a slightly different manner than the disaster recovery site if the aggregation model algorithms are even slightly different between the primary site and the disaster recovery site.

A challenge found is that today's approaches do not effectively transfer aggregation model information from the primary site to the disaster recovery site without re-building the entire aggregation model at the disaster recovery site. Unfortunately, existing approaches of re-building the aggregation model at the disaster recovery site requires intensive processing operations and consumes substantial time and processing resources. One of the major limitations of building independent models at the primary site and disaster recovery site is a compute sensitive requirement. The compute sensitive requirement is due to the primary site having more workload and therefore having more computation requirements than the disaster recovery site. For example, read and writes are served from primary site while the disaster recovery site only receives write workloads. When a disaster recovery model deploys in the cloud infrastructure, the compute billing typically increases as the complete model is generated at the disaster recovery site based on the incoming change-datasets.

FIGS. 3 through 7 depict an approach that can be executed on an information handling system that enables differential replication of a primary site's aggregation models and corresponding training datasets at a disaster recovery site. In one embodiment, the approach provides a way to achieve faster machine learning model building at disaster recovery locations, which is much needed especially in environments of multi-user planes and HA planes. The approach also provides a mechanism by which time critical applications have disaster recovery capabilities for their machine learning models with comparatively less compute and data transmission requirements because sampling reconstruction is not required.

In another embodiment, the approach provides a mechanism that allows a platform to create and maintain a machine learning mode at the disaster recovery site without retriggering the training at the disaster recovery location. In this embodiment, existing insights are mapped directly to the disaster recovery model to quickly rebuild the disaster recovery machine learning models.

In yet another embodiment, the approach provides a way to communicate with peer machine learning models in the disaster recovery plane, exchange samples and hosting infrastructure metadata, and to add an entry in a remote table that generates faster decisions and minimizes synchronization pause times. In addition, the approach disclosed herein adopts dynamic machine learning model local mapping database (LMD) performance updates that help to deliver real-time user benefits.

Figure 3:
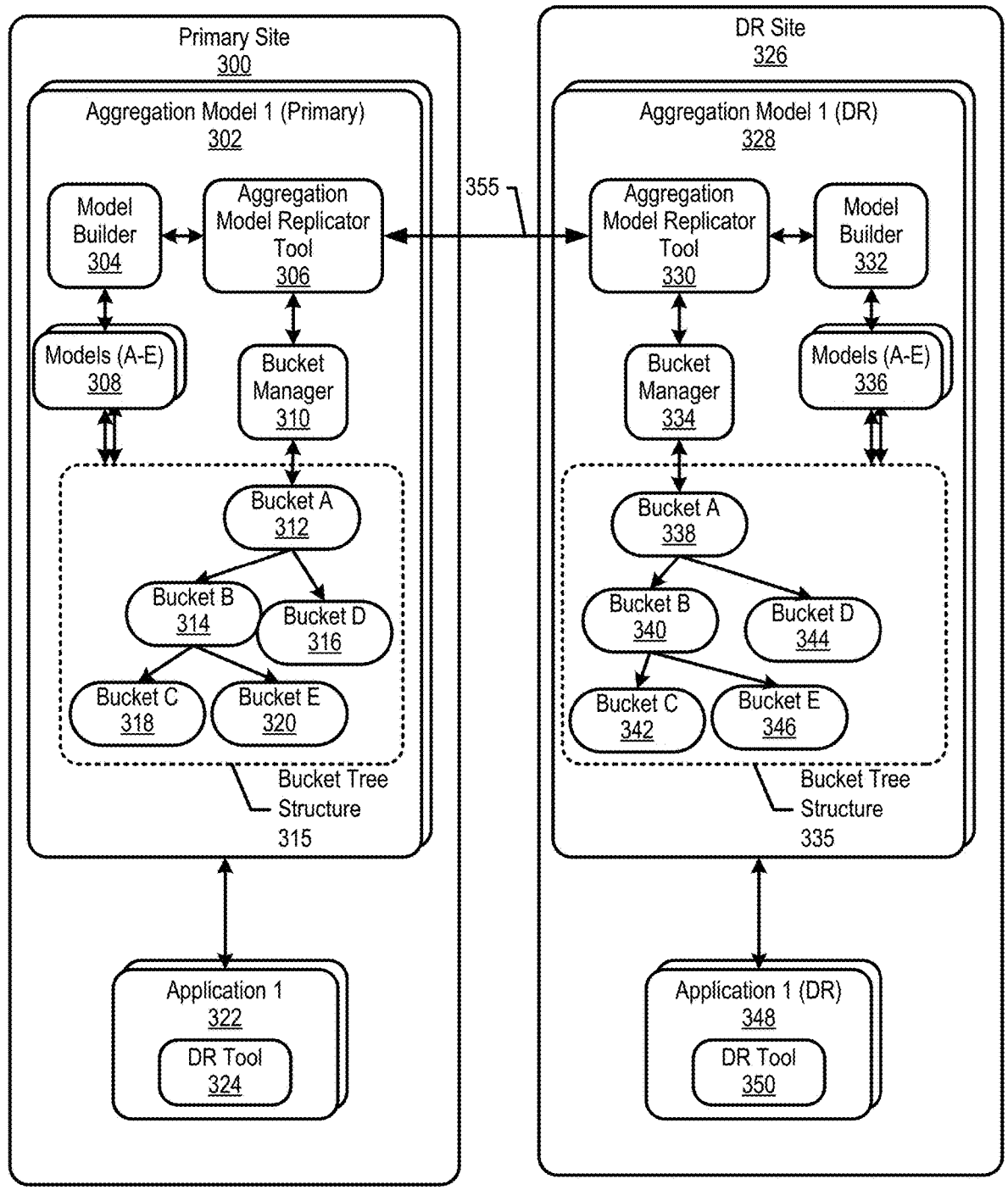
FIG. 3 is an exemplary diagram depicting a primary site dynamically sending differential changes of an aggregation algorithm and training buckets to a disaster recovery site for replication.

FIG. 3 is an exemplary diagram depicting a primary site dynamically sending differential changes of an aggregation algorithm and training buckets to a disaster recovery site for replication.

Primary site 300 includes aggregation model 1 302, and disaster recovery site 326 includes corresponding aggregation model 1 (DR) 328. Aggregation model 1 302 includes aggregation model replicator tool 306, and aggregation model 1 (DR) 328 includes aggregation model replicator tool 330. Aggregation model replicator tool 306 and aggregation model replicator tool 330 communicate over tunnel 355 (e.g., secure shell (SSH) tunnel) via an understandable protocol and handshaking protocol to agree on aggregation model replication at disaster recovery site 326.

Within aggregation model 1 302, model builder 304 builds models 308 with corresponding training datasets that are partitioned into buckets shown in bucket tree structure 315. Each one of buckets A 312, B 314, C 318, D 316, and E 320 correspond to one of models A-E 308. Bucket tree structure 315 shows how the various buckets flow up to a top bucket A 213. As a learning corpus is pushed into model builder 304, the aggregation models build/update buckets 315 that include a set of datasets and bucket manager 310 updates bucket tree structure 315 accordingly.

Bucket tree structure 315 is formed at primary site 300 and is used to classify the datasets in the corpus. Aggregation model replicator tool 306 initiates at the time that model builder 304 begins building models (A-E) 308 and communicates with aggregation model replicator tool 330 at disaster recovery site 326 to initiate model replication (models A-E 336) and bucket replication (bucket tree structure 335) at disaster recovery site 326.

Model builder 304 attaches to aggregation model replicator tool 306 and aggregation model replicator tool 306 monitors the aggregation strategy of the buckets by model builder 304 based on the available trained records. For example, when new training is issued to a model, bucket manager 310 changes the current buckets to new structure which then needs to be updated at disaster recovery site 326. Aggregation model replicator tool 306 independently transmits the changed records to aggregation model replicator tool 330 at disaster recovery site 326 to provide availability of the dataset records at both the sites.

Bucket manager 310 is a primary data collector that collects the bucketing metadata from bucket tree structure 315 and derives the dataset pointers that are mapped to a particular bucket in disaster recovery tool 324. This metadata is transferred to disaster recovery site 326 via tunnel 355. The change-data in the metadata objects are received at disaster recovery site 326 and aggregation model replicator tool 330 computes local mapping to ensure the correct target mapping of the records with their buckets. Based on the connection of local data structures of the disaster recovery tool 350, the aggregation model replicator tool 330 is activated on disaster recovery site 326 that replicates the mapped buckets and dataset pointers at disaster recovery site 326.

A polling function within disaster recovery tool 324 on the primary site thread monitors the model aggregator function for any change in the buckets. This is typically performed to identify when model builder 304 decides to change the aggregation strategy as it receives more training and execution corpus over time. Once the bucket changes are performed, aggregation model replicator tool 306 computes the difference in the metadata pointers for the respective records and pushes these records to aggregation model replicator tool 330 as the captured change data.

In one embodiment, aggregation model replicator tool 306 converges the buckets in the aggregator model or separates existing buckets based on derived insights. This change in the existing bucketization triggers model replication and the information is exacted to disaster recovery site 326. Disaster recovery site 326 receives the functions and executes them to superimpose the existing metadata differences, which is a very light weight operation that saves the re-computation of the aggregation at disaster recovery site 326 (see FIG. 6 and corresponding text for further details).

In another embodiment, as the aggregation is performed only once for both primary site 300 and disaster recovery site 326, the difference is ensured between the copies at the different sites as they are computed only once. This embodiment adds consistency in aggregation artificial intelligence (AI) algorithms that are dependent on the model outcomes. Generally, disaster recovery for the model functions and the databases are created as a service over public cloud instances and therefore this saves the model reconstruction cost that is straight mapped with the monetary value of resource utilization.

Figure 4:
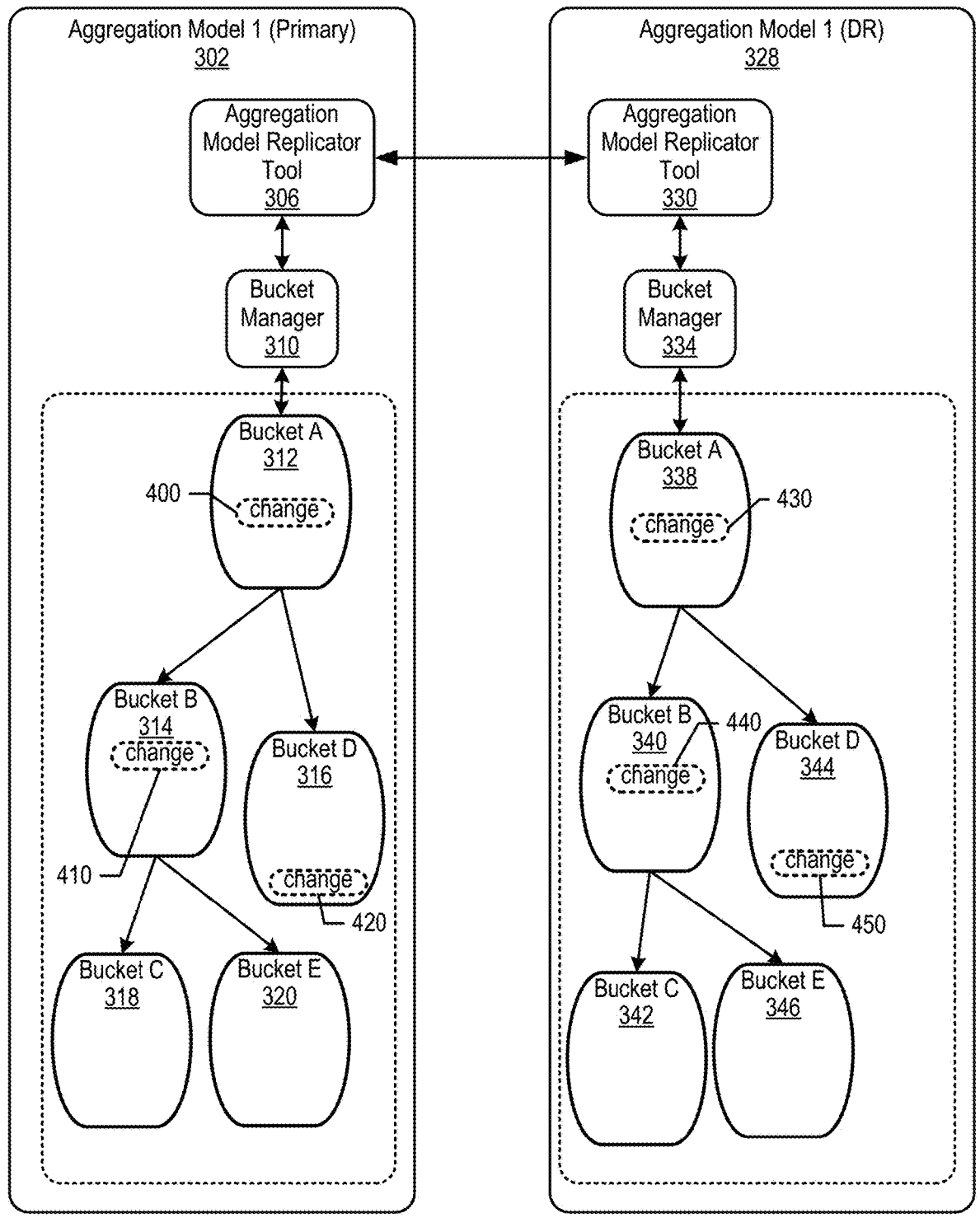
FIG. 4 is an exemplary diagram depicting a detailed view of sending differential data bucket changes from a primary site to a disaster recovery site and efficiently updating the disaster recovery site's data buckets.

FIG. 4 is an exemplary diagram depicting a detailed view of sending differential data bucket changes from a primary site to a disaster recovery site and efficiently updating the disaster recovery site's data buckets. FIG. 4 shows that bucket A 312 includes differential change 400, such as from bootstrap bagging new corpus data as discussed herein. Bucket B 314 includes differential change 410, and bucket D 316 includes differential change 420.

Bucket manager 310 works with aggregation model replicator tool 306 to send the differential changes over to aggregation model replicator tool 330. Aggregation model replicator tool 330 works with bucket manager 334 to implement the changes into bucket A 330 (differential change 430), bucket B 340 (differential change 440), and bucket D 344 (differential change 450). In turn, the respective machine learning models A-E 336 in aggregation model replicator tool 326 may be refined based on the differential changes to their respective data buckets.

Figure 5:
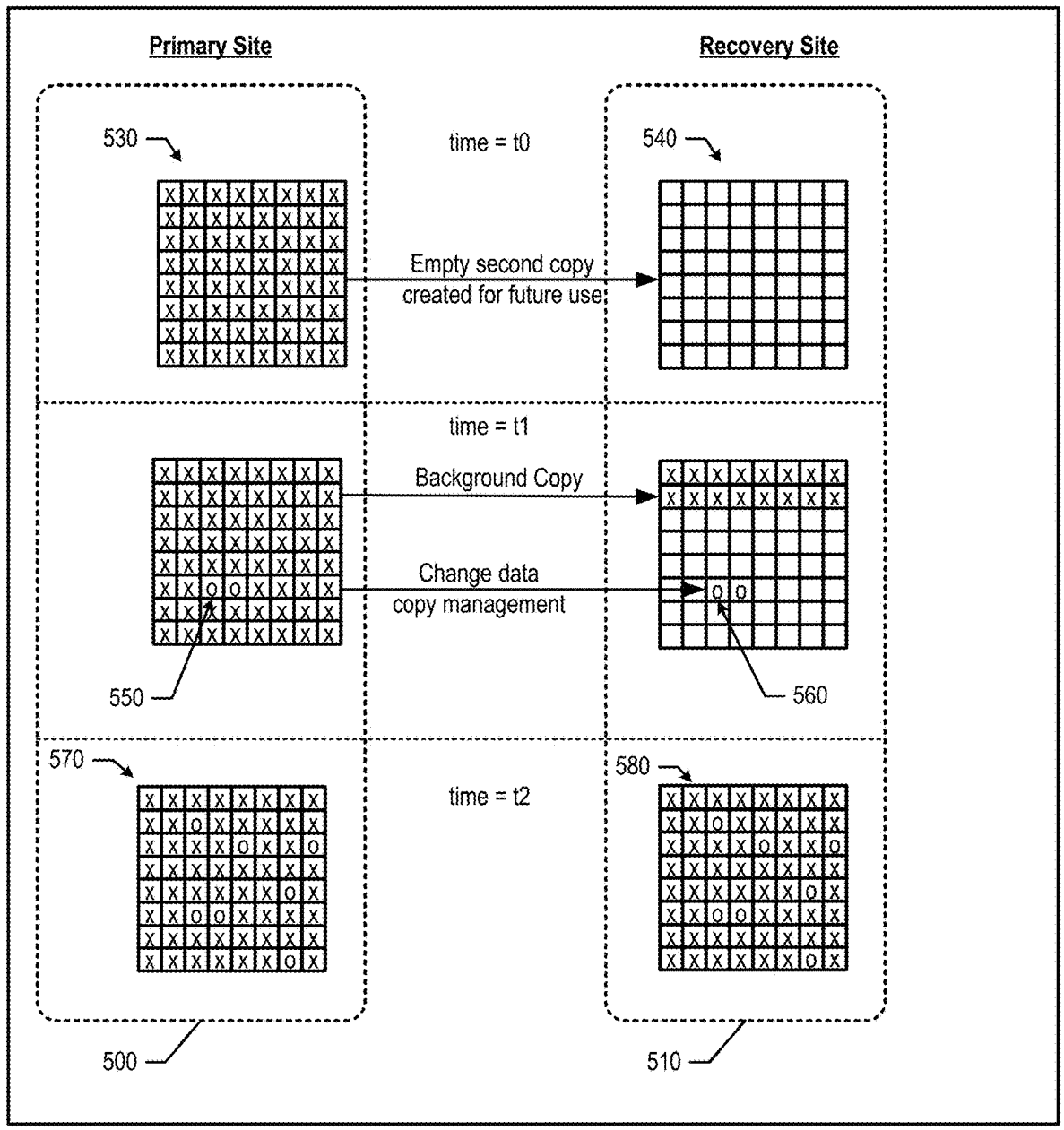
FIG. 5 is an exemplary diagram depicting a primary site sending differential dataset information to a disaster recovery site for the disaster recovery site to perform differential replication.

FIG. 5 is an exemplary diagram depicting a primary site sending differential dataset information to a disaster recovery site for the disaster recovery site to perform differential replication. Section 500 represents changes to one of the buckets in bucket tree structure 315 at primary site 300, and section 510 represents changes implemented in one of the buckets in bucket tree structure 335 at disaster recovery site 326. The changes are tracked and the differences are updated at disaster recovery site 325.

At time t0, which is before instantiation of aggregation model replicator tool 305, metadata grains 530 is full and an empty copy 540 is created by aggregation model replicator tool 330 at disaster recovery site 326 for future use.

At time t1, when aggregation model replicator tool 306 detects a change in metadata 550, aggregation model replicator tool 306 sends the changes to aggregation model replicator tool 330 at disaster recovery site 326, and aggregation model replicator tool 330 instructs bucket manager 334 to make duplicate changes to a corresponding target bucket in bucket tree structure 335 by changing metadata 560.

At time t2, the change in metadata is saved is a DIFF file and aggregation model replicator tool 306 pushes the DIFF file to aggregation model replicator tool 330. In turn, aggregation model replicator tool 330 pushes the DIFF file to bucket manager 334 and bucket manager 334 makes the changes to bucket tree structure 335.

Figure 6:
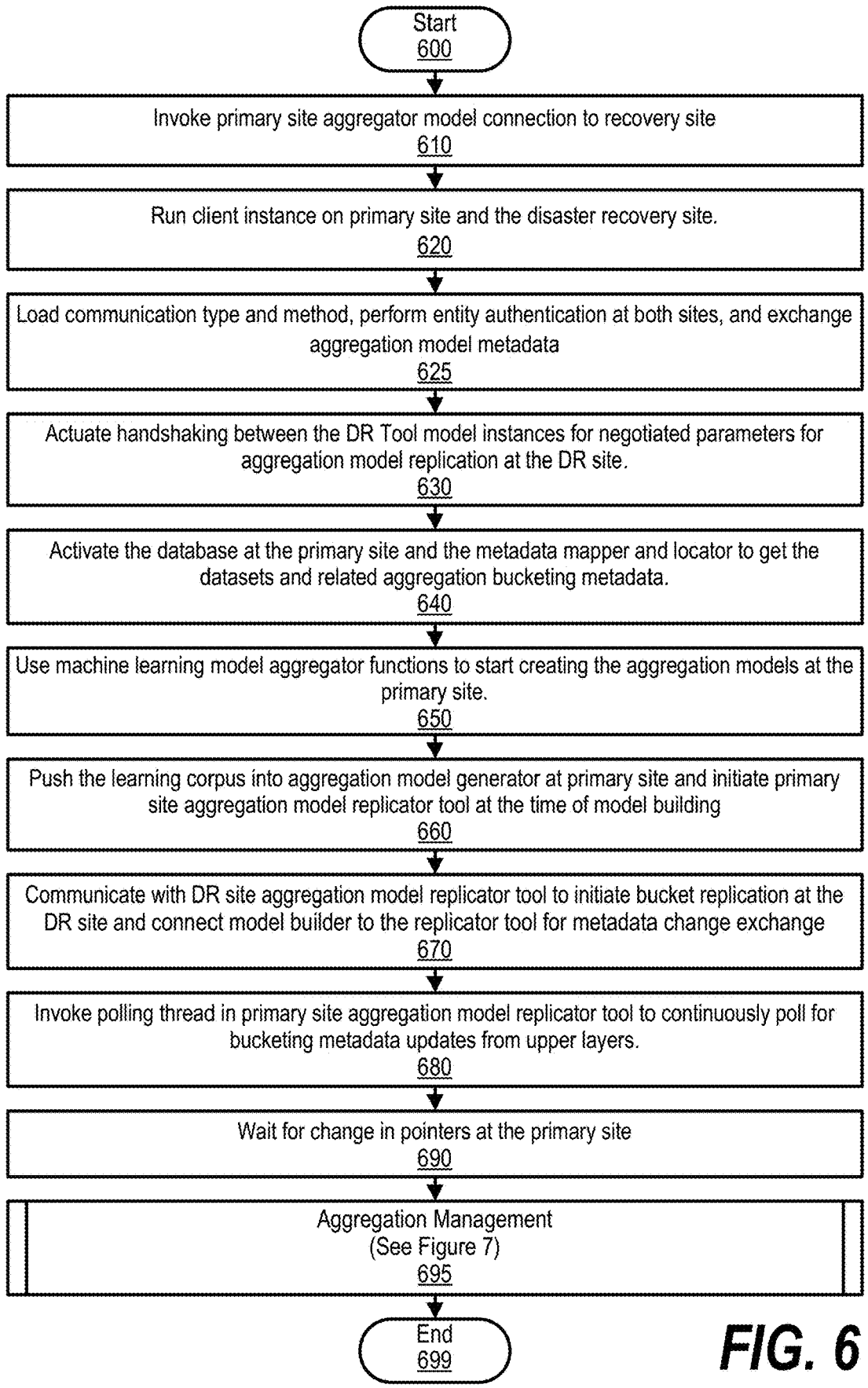
FIG. 6 is an exemplary flowchart showing steps taken to manage cognitive models at a disaster recovery site.

FIG. 6 is an exemplary flowchart showing steps taken to manage cognitive models at a disaster recovery site. FIG. 6 processing commences at 600 whereupon, at step 610, the process invokes primary site aggregator model connection 355 to disaster recovery site 326. At step 620, the process runs client instances of disaster recovery tool 324 on primary site 300, and disaster recovery tool 350 disaster recovery site 326.

At step 625, the process loads the communication type and communication method between primary site 300 and disaster recovery site 326, performs entity authentication at both sites, and exchanges aggregation model metadata (e.g., bucket information) generated by their respective bucket managers 310 and 334.

At step 630, the process actuates handshaking between disaster recovery tool 324 and disaster recovery tool 350 for negotiated parameters for aggregation model replication at the disaster recovery site 326. At step 640, the process activates a database, metadata mapper, and locator at primary site 300 to capture the datasets and related aggregation bucketing metadata in buckets 315.

At step 650, the process uses machine learning model aggregator functions to start creating aggregation models 308 at primary site 300. At step 660, the process pushes the learning corpus into model builder 304 at primary site 300 and initiates primary site aggregation model replicator tool 306 at the time of model building. At step 670, the process communicates with aggregation model replicator tool 330 to initiate bucket replication at disaster recovery site 326 and connects model builder 332 to aggregation model replicator tool 330 for metadata change exchange.

At step 680, the process invokes a polling thread in aggregation model replicator tool 306 to continuously poll for bucketing metadata updates in buckets 315 from upper layers. At step 690, the process waits for a change in pointers from bucket manager 310 at primary site and, when the process detects a change in pointers, the process performs aggregation management steps to transmit the changes to disaster recovery site 326 (pre-defined process block 695, see FIG. 7 and corresponding text for processing details). FIG. 6 processing thereafter ends at 699.

Figure 7:
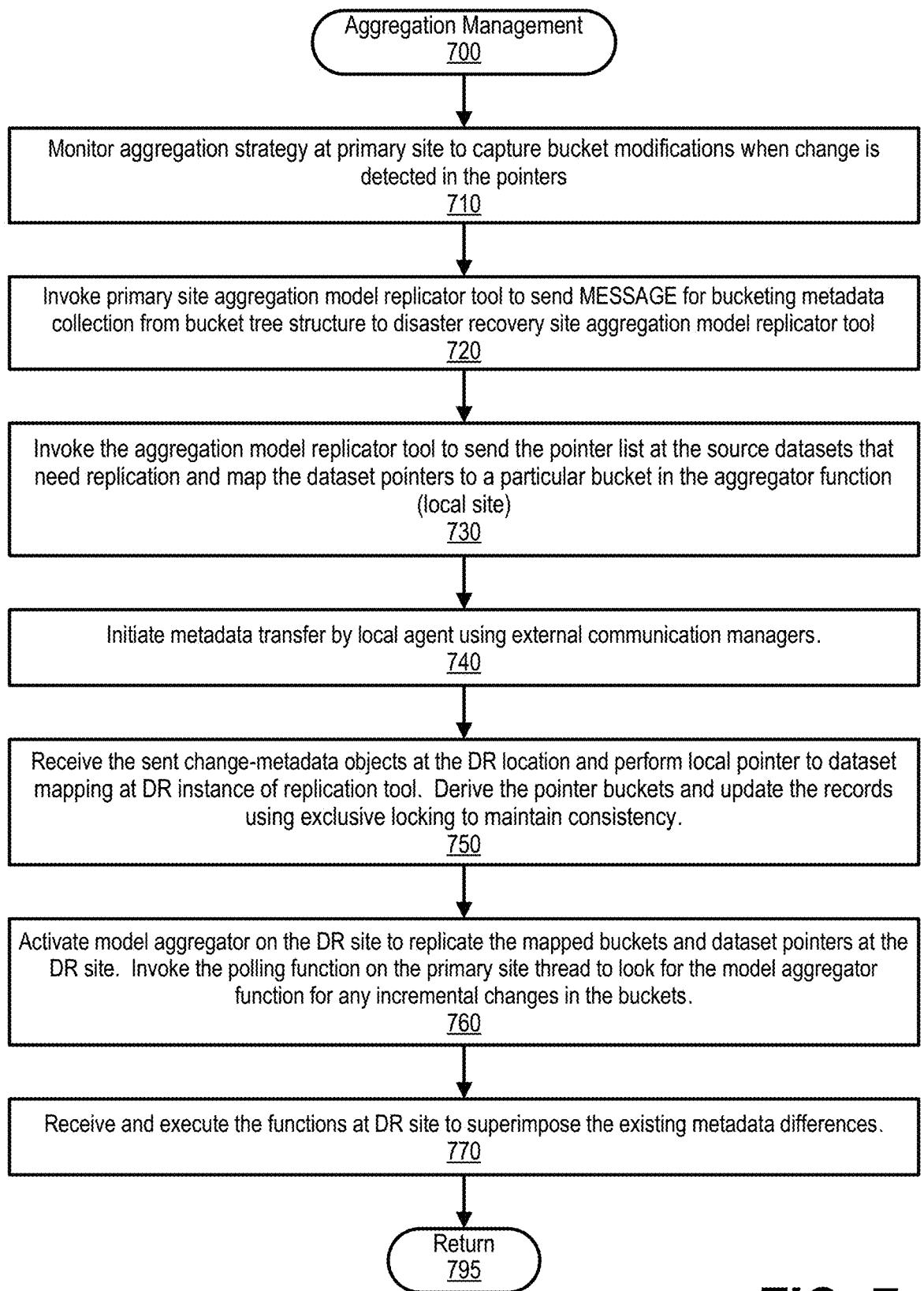
FIG. 7 is an exemplary flowchart showing steps taken to send bucket changes detected at a primary site to a disaster recovery site.

FIG. 7 is an exemplary flowchart showing steps taken to send bucket changes detected at primary site 300 to disaster recovery site 326. FIG. 7 processing commences at 700 whereupon, at step 710, the process monitors the aggregation strategy at primary site to capture bucket modifications when change is detected in the pointers.

At step 720, the process invokes aggregation model replicator tool 306 to send a message to aggregation model replicator tool 330 for bucketing metadata collection from bucket tree structure 315. At step 730, the process invokes aggregation model replicator tool 306 to send the pointer list at the source datasets that needs replication and maps the dataset pointers to a particular bucket in the aggregator function (local site).

At step 740, the process initiates a metadata transfer by aggregation model replicator tool 306 using external communication managers. At step 750, at disaster recovery site 326, aggregation model replicator tool 330 receives the metadata and performs a local pointer to dataset mapping to derive the pointer buckets and update the records using exclusive locking to maintain consistency.

At step 760, the process activates aggregation model replicator tool 330 to replicate the mapped buckets and dataset pointers at disaster recovery site 326 via bucket manager 334. The process invokes the polling function on primary site 300 to look for the model aggregator function for any incremental change in the buckets. FIG. 7 processing thereafter returns to the calling routine (see FIG. 6) at 795.

While particular embodiments of the present disclosure have been shown and described, it will be obvious to those skilled in the art that, based upon the teachings herein, that changes and modifications may be made without departing from this disclosure and its broader aspects. Therefore, the appended claims are to encompass within their scope all such changes and modifications as are within the true spirit and scope of this disclosure. Furthermore, it is to be understood that the disclosure is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to disclosures containing only one such element, even when the same claim includes the introductory phrases "one or more" or "at least one" and indefinite articles such as "a" or "an"; the same holds true for the use in the claims of definite articles.

What is claimed is:

1. A computer-implemented method comprising:
   establishing a connection between a first data site and a second data site, wherein the first data site executes a first aggregation model comprising a plurality of first machine learning models and the second data site executes a second aggregation model comprising a plurality of second machine learning models;
   creating the plurality of first training data buckets at the first data site based on bootstrap aggregating an initial corpus;
   building the plurality of first machine learning models based on the plurality of first training data buckets;
   sending the plurality of first training data buckets from the first data site to the second data site;
   replicating, at the second data site, the plurality of first training data buckets as the plurality of second training data buckets;
   expanding the initial corpus by adding a new set of training data;
   refining the plurality of first training data buckets based on bootstrap aggregating the expanded corpus;
   determining a differential change in metadata between the selected first training bucket and the refined selected first training bucket;
   sending the differential change in metadata to the second data site;
   refining the plurality of second training data buckets based on the differential change in metadata;
   detecting, at the first data site, a change of data in a selected one of the plurality of first training data buckets corresponding to a selected one of the plurality of first machine learning models;
   sending the change of data from the first data site to the second data site; and
   replicating, at the second data site, one of the plurality of second data buckets corresponding to a selected one of the plurality of second machine learning models based on the change of data.

2. The computer-implemented method of claim 1 further comprising:
   rebuilding, at the first data site, one or more of the plurality of first machine learning models using the refined plurality of first training buckets; and
   rebuilding, at the second data site, one or more of the plurality of second machine learning models using the refined plurality of second training buckets.

3. The computer-implemented method of claim 1 further comprising:
   capturing an aggregation strategy at the first data site to build the first aggregation model comprising the plurality of first machine learning models;
   sending the aggregation strategy from the first data site to the second data site; and
   building, at the second data site, the second aggregation model comprising the plurality of second machine learning models based on the aggregation strategy.

4. The computer-implemented method of claim 3 further comprising:
   detecting a change in the aggregation strategy at the first data site;
   sending the change in aggregation strategy from the first data site to the second data site; and
   modifying, by the second data site, the second aggregation model comprising the plurality of second machine learning models based on the change in the aggregation strategy.

5. The computer-implemented method of claim 1 further comprising:
   building a first bucket tree structure at the first data site, wherein the first bucket tree structure is a hierarchical representation of the plurality of first training data buckets; and
   replicating, at the second data site, the first bucket tree as a second bucket tree structure that is a hierarchical representation of the plurality of second training data buckets.

6. An information handling system comprising:
one or more processors;
a memory coupled to at least one of the processors;
a set of computer program instructions stored in the memory and executed by at least one of the processors in order to perform actions of:
  establishing a connection between a first data site and a second data site, wherein the first data site executes a first aggregation model comprising a plurality of first machine learning models and the second data site executes a second aggregation model comprising a plurality of second machine learning models;
  deriving dataset pointers from a plurality of first training data buckets and to a plurality of second training data buckets in a disaster recovery tool and mapping the dataset pointers from the plurality of first training data buckets to the plurality of second training data buckets
  creating the plurality of first training data buckets at the first data site based on bootstrap aggregating an initial corpus;
  building the plurality of first machine learning models based on the plurality of first training data buckets;
  sending the plurality of first training data buckets from the first data site to the second data site;
  replicating, at the second data site, the plurality of first training data buckets as the plurality of second training data buckets;
  expanding the initial corpus by adding a new set of training data;
  refining the plurality of first training data buckets based on bootstrap aggregating the expanded corpus;
  determining a differential change in metadata between the selected first training bucket and the refined selected first training bucket;
  sending the differential change in metadata to the second data site;
  refining the plurality of second training data buckets based on the differential change in metadata;
  detecting, at the first data site, a change of data in a selected one of a plurality of first training data buckets corresponding to a selected one of the plurality of first machine learning models;
  sending the change of data from the first data site to the second data site; and
  replicating, at the second data site, one of a plurality of second data buckets corresponding to a selected one of the plurality of second machine learning models based on the change of data.

7. The information handling system of claim 6 wherein the processors perform additional actions comprising:
  rebuilding, at the first data site, one or more of the plurality of first machine learning models using the refined plurality of first training buckets; and
  rebuilding, at the second data site, one or more of the plurality of second machine learning models using the refined plurality of second training buckets.

8. The information handling system of claim 6 wherein the processors perform additional actions comprising:
  capturing an aggregation strategy at the first data site to build the first aggregation model comprising the plurality of first machine learning models;
  sending the aggregation strategy from the first data site to the second data site; and
  building, at the second data site, the second aggregation model comprising the plurality of second machine learning models based on the aggregation strategy.

9. The information handling system of claim 8 wherein the processors perform additional actions comprising:
  detecting a change in the aggregation strategy at the first data site;
  sending the change in aggregation strategy from the first data site to the second data site; and
  modifying, by the second data site, the second aggregation model comprising the plurality of second machine learning models based on the change in the aggregation strategy.

10. The information handling system of claim 6 wherein the processors perform additional actions comprising:
  building a first bucket tree structure at the first data site, wherein the first bucket tree structure is a hierarchical representation of the plurality of first training data buckets; and
  replicating, at the second data site, the first bucket tree as a second bucket tree structure that is a hierarchical representation of the plurality of second training data buckets.

11. A computer program product stored in a computer readable storage medium, comprising computer program code that, when executed by an information handling system, causes the information handling system to perform actions comprising:
  establishing a connection between a first data site and a second data site, wherein the first data site executes a first aggregation model comprising a plurality of first machine learning models and the second data site executes a second aggregation model comprising a plurality of second machine learning models;
  deriving dataset pointers from a plurality of first training data buckets and to a plurality of second training data buckets in a disaster recovery tool and mapping the dataset pointers from the plurality of first training data buckets to the plurality of second training data buckets
  creating the plurality of first training data buckets at the first data site based on bootstrap aggregating an initial corpus;
  building the plurality of first machine learning models based on the plurality of first training data buckets;
  sending the plurality of first training data buckets from the first data site to the second data site;
  replicating, at the second data site, the plurality of first training data buckets as the plurality of second training data buckets;
  expanding the initial corpus by adding a new set of training data;
  refining the plurality of first training data buckets based on bootstrap aggregating the expanded corpus;
  determining a differential change in metadata between the selected first training bucket and the refined selected first training bucket;
  sending the differential change in metadata to the second data site;
  refining the plurality of second training data buckets based on the differential change in metadata;
  detecting, at the first data site, a change of data in a selected one of a plurality of first training data buckets corresponding to a selected one of the plurality of first machine learning models;
  sending the change of data from the first data site to the second data site; and
  replicating, at the second data site, one of a plurality of second data buckets corresponding to a selected one of the plurality of second machine learning models based on the change of data.

12. The computer program product of claim 11 wherein the information handling system performs further actions comprising:
- rebuilding, at the first data site, one or more of the plurality of first machine learning models using the refined plurality of first training buckets; and
- rebuilding, at the second data site, one or more of the plurality of second machine learning models using the refined plurality of second training buckets.

13. The computer program product of claim 11 wherein the information handling system performs further actions comprising:
- capturing an aggregation strategy at the first data site to build the first aggregation model comprising the plurality of first machine learning models;
- sending the aggregation strategy from the first data site to the second data site; and
- building, at the second data site, the second aggregation model comprising the plurality of second machine learning models based on the aggregation strategy.

14. The computer program product of claim 13 wherein the information handling system performs further actions comprising:
- detecting a change in the aggregation strategy at the first data site;
- sending the change in aggregation strategy from the first data site to the second data site; and
- modifying, by the second data site, the second aggregation model comprising the plurality of second machine learning models based on the change in the aggregation strategy.

* * * * *